United States Patent

Järvelä

[11] Patent Number: 5,397,291
[45] Date of Patent: Mar. 14, 1995

[54] DEVICE FOR FIXING A BALANCING MATERIAL IN A ROLL

[75] Inventor: Juha Järvelä, Jyväskylä, Finland

[73] Assignee: Valmet Paper Machinery Inc., Helsinki, Finland

[21] Appl. No.: 181,769

[22] Filed: Jan. 21, 1994

Related U.S. Application Data

[62] Division of Ser. No. 982,516, Nov. 27, 1992, Pat. No. 5,331,737.

[30] Foreign Application Priority Data

Dec. 5, 1991 [FI] Finland ................................. 915750

[51] Int. Cl.$^6$ .............................................. F16C 1/00
[52] U.S. Cl. ................... 492/60; 29/895.1; 29/901
[58] Field of Search .............. 492/60; 29/895, 895.1, 29/895.21, 469.5, 901; 264/263, 267, 271.1, 238, 294; 464/180, 181; 164/98, 108

[56] References Cited

U.S. PATENT DOCUMENTS

| | | |
|---|---|---|
| 3,659,434 | 5/1972 | Wolfe .................................... 64/102 |
| 5,096,734 | 3/1992 | Nikulainen et al. .................. 427/8 |

FOREIGN PATENT DOCUMENTS

| | | |
|---|---|---|
| 80954 | 12/1989 | Finland . |
| 2543203 | 3/1977 | Germany . |
| 1142942 | 2/1969 | United Kingdom . |

*Primary Examiner*—Irene Cuda
*Attorney, Agent, or Firm*—Steinberg, Raskin & Davidson

[57] ABSTRACT

A device for fixing a material used for balancing of a roll in which a support and fixing construction for a fluidized balancing material is placed into the roll interior in contact with an inner face of the roll. The fluidized balancing material is then placed inside the roll at the location required by the balancing, where it is fixed and hardens. The support and fixing construction includes openings, which permit the balancing material to be placed at both sides of the support and fixing construction before it hardens and is fixed at the location required by the balancing.

13 Claims, 3 Drawing Sheets

DEVICE FOR FIXING A BALANCING MATERIAL IN A ROLL

This is a division of application Ser. No. 07/982,516, filed Nov. 27, 1992, now U.S. Pat. No. 5,331,737.

BACKGROUND OF THE INVENTION

The invention relates to a method and device for fixing a material used for balancing of a roll, in particular the balancing of a roll used in paper machines.

In the prior art, a method and device for balancing paper-machine cylinders and rolls are known, wherein a fluidized balancing material is placed on an inside face of a roll at a required balancing location. At the required balancing location, the material adheres to the face of the roll and hardens. The balancing material used in the prior art method and device is preferably polyurethane, silicone mix or epoxy resin.

OBJECTS AND SUMMARY OF THE INVENTION

It is an object of the present invention to provide a new and improved method and device to ensure reliable fixing of a balancing material at the balancing location in a roll.

It is another object of the present invention to provide a new and improved method and device for balancing a roll in which a support and fixing construction is utilized to which the balancing material adheres and hardens in the desired location for balancing the roll.

In the present invention, a support and fixing construction is arranged inside the roll. A fluidized balancing material is applied to the support and fixing construction in a desired location for balancing and adheres to the construction. Thereafter, the fluidized material hardens on the support and fixing construction so that the roll will be balanced. In a preferred embodiment, the support and fixing construction is a net which has openings to allow the balancing material to flow to both sides of the support and fixing construction.

In a balancing method in accordance with the invention, the support and fixing construction for the fluidized balancing material is placed into the interior of the roll to be balanced before the fluidized balancing material is applied to the support and fixing construction. The construction is placed in contact with the inner face of the roll only over a part of the distance, i.e. the construction only contacts a portion of the roll and not the entire interior surface. The support and fixing construction is provided with openings, or other equivalent apertures, which permit the balancing material to be placed at both sides of the support and fixing construction before the fluidized balancing material hardens and is fixed at the location required by the balancing in the support and fixing construction.

In the device in accordance with the invention which is used in the balancing method of the present invention, a support and fixing construction is provided which is a circumferential construction placed in contact with the inner face of the roll over a part of the distance only. The support and fixing construction has openings, or equivalent, through which the fluidized balancing material flows to both sides of the support and fixing construction before it hardens and is fixed to the support and fixing construction, thus, the support and fixing construction forms a support and fixing base for the balancing material.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1A:
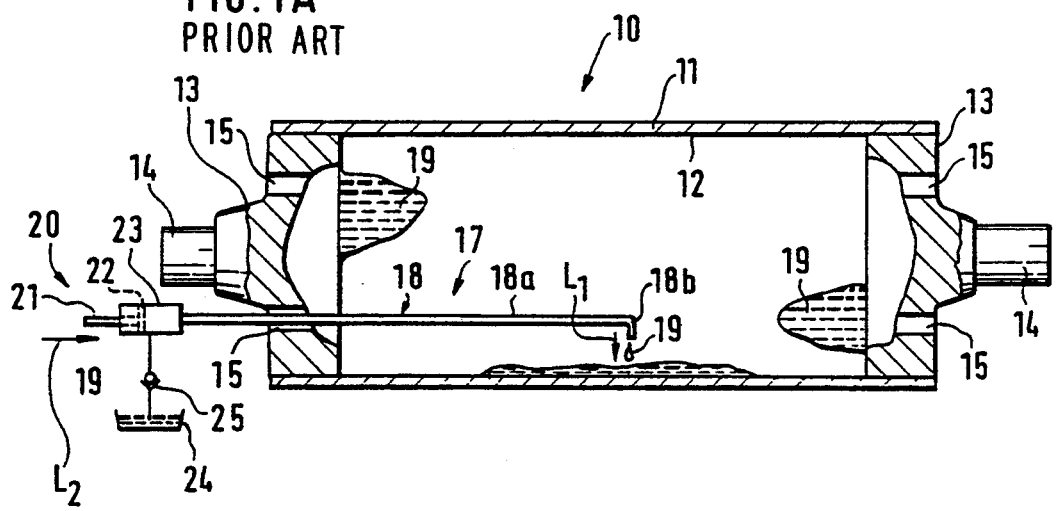
FIG. 1A is a longitudinal sectional view of a paper-machine roll having a balancing system which exemplifies a prior art balancing method and device.

FIG. 1A illustrates a prior art method and device for balancing a roll used in a paper machine. A roll 10 comprises a roll mantle 11 having a flange 13 and an axle 14 at each of its ends. The flange 13 includes a hole 15 passing through the flange, preferably a cast hole or a separate bore drilled into the roll 10 after casting the roll. A counterweight applicator 17 comprises a duct 18 through which a balancing material 19 is applied to an inner face 12 of the roll 10 at a required balancing location. Duct 18 is preferably a rigid pipe. The pipe 18 comprises a linear portion 18a and an end part 18b which is at an angle of approximately 90° to the linear portion 18a. The pipe 18 is passed into the roll 10 through the hole 15.

The balancing material used in this method and device is a resilient, elastic fluidized mix, which hardens to its ultimate hardness only after it has been placed at the balancing location on the inner face 12 of the roll 10 as shown in FIG. 1A (arrow $L_1$).

An actuator 20 is arranged at an end of the pipe 18. By means of the actuator 20, the balancing material 19 is carried to the balancing point or location on the inner face of the roll. Preferably, the actuator 20 consists of a cylinder which includes a piston 22. The balancing material is drawn by suction into the space between cylinder mantle 23 and the piston 22 out of a tank 24 or equivalent holding device for the balancing material.

By means of a shaft 21, the piston 22 is moved in the direction indicated by arrow $L_2$ and the balancing material is extruded through the pipe 18 to the balancing point. The balancing agent is prevented from flowing back into the tank 24 by back stop valves 25. As the balancing material 19, it is known to use polyurethane, silicone mix or epoxy resin.

Figure 1B:
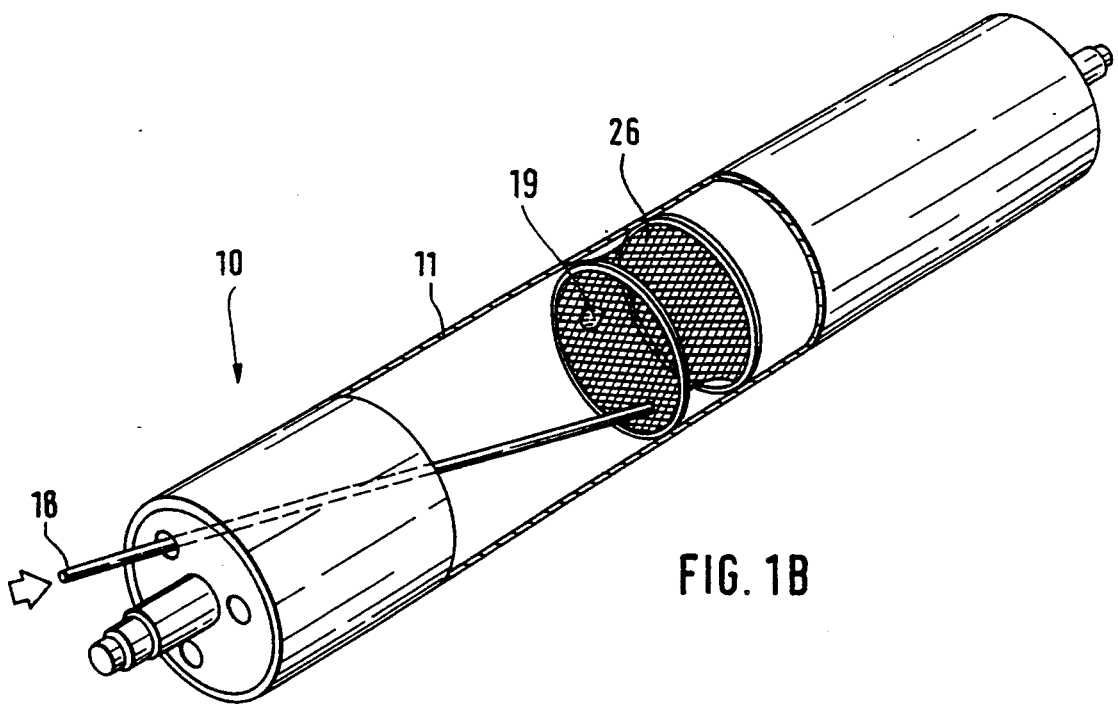
FIG. 1B shows a device in accordance with the invention which is used in a method in accordance with the invention.

FIG. 1B shows a device in accordance with the invention for use in a method in accordance with the present invention. A balancing material 19 is passed through a linear pipe 18 into contact with a support and fixing construction 26 provided for the balancing material 19. In this illustrated embodiment of the present invention, the support and fixing construction is a net construction whose net part is placed at a distance from the inner wall of the roll mantle 11. The net construction has a plurality of openings.

The device further comprises at least one pipe 18 as shown in FIG. 1B to conduct the fluidized balancing material to the support and fixing construction. In an embodiment of the device wherein several pipes are used (not shown), the components of the balancing material, such as polyurethane, are not mixed together until they are in a nozzle part connected to the ends of the pipes. If a single component material, such as fluidized metal, is used as the balancing material, the device operates with only one pipe.

Figure 2A:
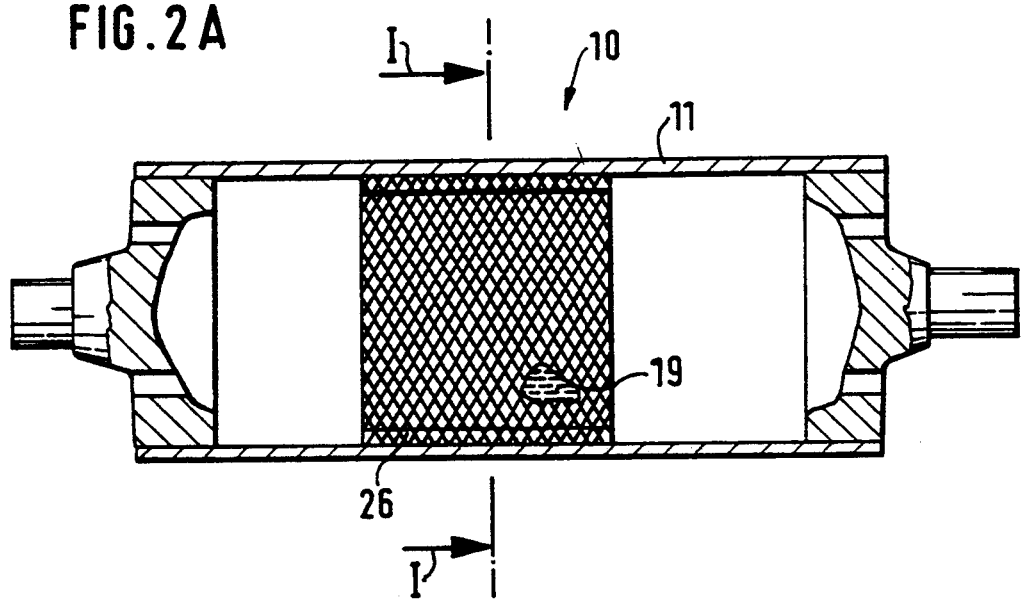
FIG. 2A is a longitudinal sectional view of a paper-machine roll provided with a device in accordance with the present invention.

FIG. 2A is a sectional view of a balancing construction for use in a device and method in accordance with the invention. The balancing construction comprises a support and fixing construction 26 for a balancing material passed into the interior of a roll mantle 11. The support and fixing construction 26 is preferably a circumferential net construction having a width of from about 800 mm to about 1000 mm. The support and fixing construction is placed in contact with a face 12 of the roll over a part of the total length of the roll 10 and also slightly apart from the roll face 12. The net construction 26 operates as a fixing base for the fluidized balancing material that subsequently hardens and as a support construction for the balancing material. Through openings in the net construction, the fluidized balancing material 19 is carried to both sides of the net construction before it hardens and is fixed to the net construction.

As shown in FIG. 2A, the support and fixing construction 26 is preferably a net construction formed in a wave-shaped form. By shaping the net in this form, the support and fixing construction 26 has an advantageous rigidity and can be fixed reliably to the inner face of the roll mantle so that radial or axial movements of the construction 26 are substantially prevented.

Figure 2B:
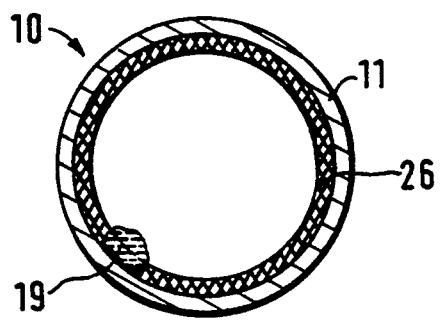
FIG. 2B is a sectional view of a device in accordance with the invention as illustrated in FIG. 2A taken along the line I—I in FIG. 2A.

FIG. 2B is a sectional view taken along the line I—I in FIG. 2A and through the net construction 26. As shown in FIGS. 2A and 2B, the support and fixing construction 26 is a substantially cylindrical construction, preferably of circular cross-section, formed in a shrunken wave form. The construction 26 contacts the inner face of the roll mantle only over a portion of the length of the roll and preferably at the crests of the waves of the wave-shaped construction 26. Furthermore, the support and fixing construction 26 is preferably a net construction whereby the net operates as the support and fixing construction for the balancing material, such as polyurethane, and is in contact with the roll by means of press-on fitting or spring force.

Figure 3:
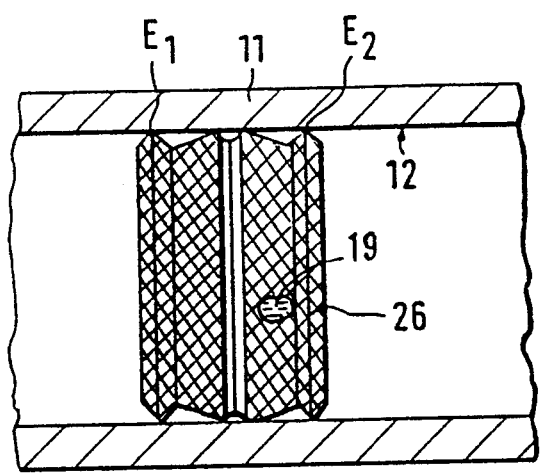
FIG. 3 is a partial sectional view of an embodiment of a support and fixing construction used for balancing a roll in the present invention.

FIG. 3 is a sectional view of a roll which comprises a net construction as the support and fixing construction 26 for the balancing material 19 in accordance with the invention. The fluidized balancing material 19 is applied to the net construction so that it is fixed and hardens on the net construction 26. The wave shape of the support and fixing construction 26 is arranged so that the wave crests $E_1$, $E_2$, ..., pass along a circumferential and circular path. In such a case, the construction obtains sufficient rigidity so that the support and fixing construction 26 is kept in contact with the roll by means of a press-on fitting.

Figure 4:
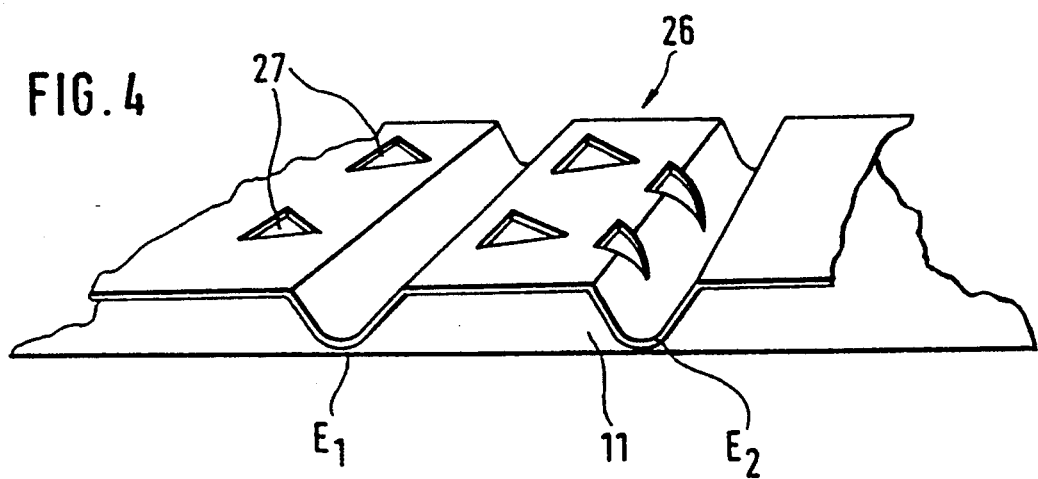
FIG. 4 is an partial axonometric illustration of a second embodiment of a support and fixing construction of the present invention for balancing a roll.

FIG. 4 shows a second embodiment of the support and fixing construction 26 used in the balancing device and method of the present invention. The support and fixing construction is a circumferential construction made from a metal sheet or plate worked to wave-shaped form. Openings 27 have been punched into the metal sheet of the plate construction 26. The openings 27 permit the balancing material to be positioned on both sides of the plate construction and, thus, enable the plate construction to operate as a central support construction for the balancing material.

The support and fixing construction contacts the inner face of the roll 10 by means of a press-on fitting in a similar manner as the support and fixing construction 26 shown in FIGS. 1B ... 3 have been fixed to the inner face 12 of the roll 10 to be balanced by means of press-on fittings.

The examples provided above are not meant to be exclusive. Many other variations of the present invention would be obvious to those skilled in the art, and are contemplated to be within the scope of the appended claims.

What is claimed is:

1. A device for balancing a roll having an interior and an inner surface, and wherein a fluidized balancing material is passed into the roll interior to a location required for balancing the roll, comprising
   a support and fixing construction for arrangement in the interior of the roll, said support and fixing construction having a first side contacting at least a portion of the inner surface of the roll and an opposed second side, the fluidized balancing material being introduced onto said support and fixing construction at a location required for balancing the roll,
   said support and fixing construction having openings through which the balancing material is passable to said first and second sides of said support and fixing construction, whereby upon adhering and hardening of the balancing material to said support and fixing construction, said support and fixing construction forms a support and fixing base for the balancing material.

2. A device as claimed in claim 1, wherein said support and fixing construction has a substantially cylindrical shape having edges arranged to contact the inner surface of the roll.

3. A device as claimed in claim 1, wherein said support and fixing construction contacts only a part of the length of the roll inner surface of the.

4. A device as claimed in claim 1, wherein said support and fixing construction has a substantially circular cross-section.

5. A device as claimed in claim 1, wherein said support and fixing construction is a net construction.

6. A device as claimed in claim 1, wherein said support and fixing construction is a substantially cylindrical construction a cylindrical surface of which has a wave-shaped form, said substantially cylindrical construction comprising openings formed therein to permit the balancing material to flow to said first and second sides of said support and fixing construction at the location required for balancing the roll.

7. A device as claimed in claim 1, wherein said support and fixing construction has a substantially cylindrical shape a cylindrical surface of which has a wave-shaped form having wave crests, said support and fixing construction contacting the inner surface of the roll at the wave crests of the wave-shaped form.

8. A device as claimed in claim 1, wherein said support and fixing construction is fixed to the inner surface of the roll by means of a press-on fitting.

9. A device as claimed in claim 1, wherein said support and fixing construction is fixed to the inner surface of the roll by spring force.

10. A device as claimed in claim 1, wherein the balancing material is polyurethane, silicon mix or epoxy resin.

11. A device as claimed in claim 1, wherein the balancing material is introduced onto said support and fixing construction by means of a pipe.

12. A device as claimed in claim 11, wherein a hole is provided in a flange situated at an end of the roll through which the pipe is introduced into the interior of the roll.

13. A device as claimed in claim 1, wherein said support and fixing construction is in contact with only a portion of the inner surface of the roll.

* * * * *